(12) United States Patent
Wang

(10) Patent No.: US 10,583,790 B2
(45) Date of Patent: Mar. 10, 2020

(54) ADJUSTABLE ELECTRONIC DEVICE MOUNT

(71) Applicant: Hong Wang, Staten Island, NY (US)

(72) Inventor: Hong Wang, Staten Island, NY (US)

(73) Assignee: Daniel Cotton, Austin, TX (US)

( * ) Notice: Subject to any disclaimer, the term of this patent is extended or adjusted under 35 U.S.C. 154(b) by 0 days.

(21) Appl. No.: 16/070,329

(22) PCT Filed: Nov. 9, 2016

(86) PCT No.: PCT/US2016/061106
§ 371 (c)(1),
(2) Date: Jul. 16, 2018

(87) PCT Pub. No.: WO2018/038755
PCT Pub. Date: Mar. 1, 2018

(65) Prior Publication Data
US 2019/0168683 A1    Jun. 6, 2019

Related U.S. Application Data

(63) Continuation-in-part of application No. 15/246,952, filed on Aug. 25, 2016, now abandoned.

(51) Int. Cl.
*B60R 11/02* (2006.01)
*F16M 11/04* (2006.01)
*F16M 11/14* (2006.01)
*F16M 11/20* (2006.01)
*B60R 11/00* (2006.01)

(52) U.S. Cl.
CPC .......... *B60R 11/0241* (2013.01); *B60R 11/02* (2013.01); *B60R 11/0252* (2013.01); *F16M 11/041* (2013.01); *F16M 11/14* (2013.01); *F16M 11/2078* (2013.01); *B60R 2011/0005* (2013.01); *B60R 2011/007* (2013.01); *B60R 2011/0057* (2013.01)

(58) Field of Classification Search
CPC ............... F16M 11/14; F16M 11/2078; F16M 2200/021; B60R 2011/0089; B60R 2011/0005; B60R 2011/007; Y10T 403/32032; Y10T 403/32631; Y10T 403/32311
USPC ...................... 403/56, 76, 90, 122, 127, 131
See application file for complete search history.

(56) References Cited

U.S. PATENT DOCUMENTS

| | | | | |
|---|---|---|---|---|
| 2,456,182 A | * | 12/1948 | Goble | F16L 27/047 285/153.3 |
| 4,872,630 A | | 10/1989 | Cooper | |
| 5,409,269 A | * | 4/1995 | Karlsson | F16C 11/103 285/146.1 |
| 5,419,522 A | * | 5/1995 | Luecke | F16C 11/106 248/288.51 |
| 6,158,793 A | * | 12/2000 | Castro | B60R 11/02 224/548 |

(Continued)

FOREIGN PATENT DOCUMENTS

CN        205 131 125        4/2016

*Primary Examiner* — Adam J Waggenspack
(74) *Attorney, Agent, or Firm* — Renner, Otto, Boisselle & Sklar, LLP

(57) ABSTRACT

A mount for an electronic device, including two attachment plates on either end, both secured to a joint, so as to articulatably attach the mount to a surface on one end and an electronic device on the other end.

12 Claims, 4 Drawing Sheets

(56) References Cited

U.S. PATENT DOCUMENTS

| | | | |
|---|---|---|---|
| 6,305,656 B1* | 10/2001 | Wemyss | A47G 23/0216 |
| | | | 206/5 |
| 7,431,251 B2* | 10/2008 | Carnevali | F16M 13/00 |
| | | | 224/183 |
| 7,784,953 B2* | 8/2010 | Rumsey | B60R 1/04 |
| | | | 248/481 |
| 7,993,069 B2* | 8/2011 | Persson | B60R 11/0252 |
| | | | 248/288.51 |
| 8,534,951 B2* | 9/2013 | Komine | F16C 11/106 |
| | | | 248/288.51 |
| 8,706,175 B2 | 4/2014 | Cho | |
| 8,870,146 B2 | 10/2014 | Vogel et al. | |
| D734,746 S | 7/2015 | Vogel | |
| 2004/0188576 A1 | 9/2004 | Carnevali | |
| 2009/0000457 A1 | 1/2009 | Dunlop | |
| 2011/0318093 A1 | 12/2011 | Liao | |
| 2012/0227678 A1* | 9/2012 | Milani | A01K 1/04 |
| | | | 119/712 |
| 2013/0068915 A1 | 3/2013 | Yang | |
| 2014/0191096 A1 | 7/2014 | Wiercinski et al. | |
| 2016/0023617 A1 | 1/2016 | Chow | |
| 2016/0173667 A1 | 6/2016 | Torres Gutierrez et al. | |
| 2016/0318455 A1* | 11/2016 | Zhang | F16M 11/105 |
| 2016/0368429 A1* | 12/2016 | Bernert | B60R 11/02 |

* cited by examiner

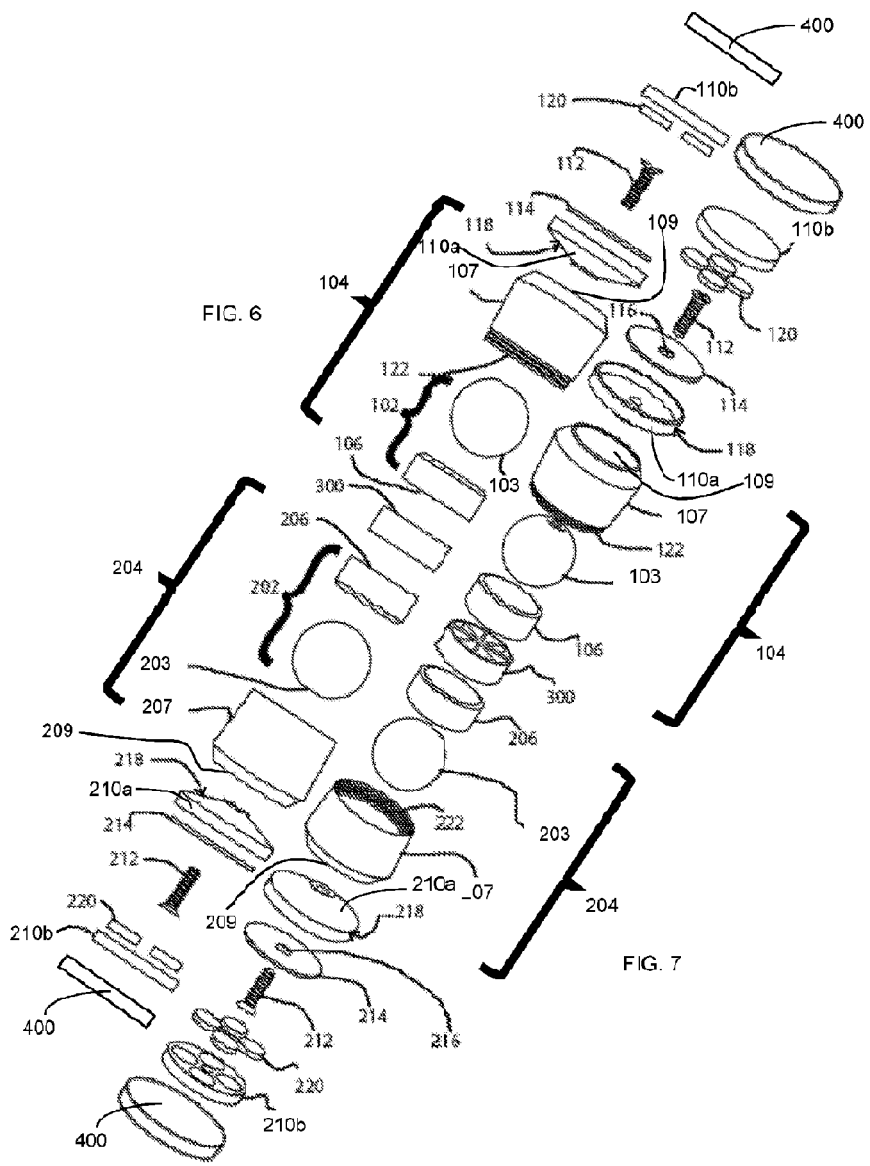

ADJUSTABLE ELECTRONIC DEVICE MOUNT

RELATED APPLICATIONS

This application is a national phase entry of International Application No. PCT/US2016/61106 filed on Nov. 9, 2016 and published in the English language, which is a continuation-in-part of U.S. application Ser. No. 15/246,952 filed on Aug. 25, 2016, both of which are herein incorporated by reference in their entirety.

TECHNICAL FIELD

The present disclosure relates generally to the field of electronic device accessories, and more particularly to mounts for electronic devices such as mobile phones or tablets.

BACKGROUND

It is known in the art that mounting assemblies are used to mount the portable electronic device to the dashboard of a vehicle. Typically these mounting assemblies include a bracket having feet which fit against the dashboard of the automobile and are held to the dashboard. Attached to the bracket is for instance a ball of a ball and socket joint. The socket of the ball and socket joint is attached thereto. A holster, or other type of container, is attached to the socket for holding for instance the portable electronic device. One such product is a relatively simple bracket whose feet fit into the seams in the dashboard. This has the advantage of requiring no fasteners, but the disadvantage that since it fits in the dashboard seams, a different bracket is required for each model of vehicle, there being no standard distance between dashboard seams. Other types of fasteners actually fasten into the dashboard for instance by screws, etc.

In other mounting means, the portable electronic device attaches to the ventilation grills typically mounted in the dashboard. These grills provide a number of vent ribs to which portable electronic device can be relatively easily clamped or mounted. Hence this is a readymade mounting area. In one such device, hooks are provided which hook around the vent ribs and a corresponding screw mechanism draws the hooks against the vent ribs. This has several disadvantages. For one thing, there is no assurance that the screw end will actually clear the ribs; also the device may not fit all vehicles.

Yet another type of mounting assembly for use with portable electronic devices is a metal clip which clamps onto the vent ribs and stabilizer legs which bear on the dashboard surrounding the ventilation grill. This type of mounting assembly, however, is not rigidly mounted. It has the advantage of being extremely adjustable, but may come loose under severe vibration. Another mounting assembly is a vent hanging bracket which includes hooks which catch on the vent ribs and a metal clip which presses against the vent, creating a snug fit. Corresponding posts mount on the dashboard. This is self-adjusting and compliant, but provides no width adjustment.

Other proposals have involved systems and methods for mounting portable electronic devices in vehicles. The problem with these mounting assemblies is that they are not adaptable to different types of dashboards and they are not flexible, so as to manipulate the portable electronic device at a desired orientation with one hand.

SUMMARY

The present disclosure provides a mount for an electronic device, including two attachment plates on either end, both secured to a joint, so as to articulatably attach the mount to a surface on one end and an electronic device on the other end.

According to one aspect, there is provided a mount for securing an electronic device to a surface, the mount includes a surface attachment plate configured to attach to the surface and a device attachment plate configured to attach to the electronic device. The mount also includes a collar including a first joint located at a first end of the collar and a second joint located at a second end of the collar. The surface attachment plate is articulatably connected to the first joint and the device attachment plate is articulatably connected to the second joint.

Alternatively or additionally, the surface attachment plate is secured to the first joint by a first post and the device attachment plate is secured to the second joint by a second post.

Alternatively or additionally, at least one of the first post or the second post are directly connected to the surface attachment plate or the device attachment plate and the first joint or the second joint.

Alternatively or additionally, the surface attachment plate is directly attached to the first joint by a first post and/or the device attachment plate is directly attached to the second joint by a second post.

Alternatively or additionally, at least one the surface attachment plate is directly attached to the first joint 204 or the device attachment plate is directly attached to the second joint.

Alternatively or additionally, the surface attachment plate and/or the device attachment plate are magnetic.

Alternatively or additionally, the surface attachment plate and/or the device attachment plate include a non-magnetic structure and at least one magnet.

Alternatively or additionally, the non-magnetic structure maintains the position of the at least one magnet.

Alternatively or additionally, the non-magnetic structure is conical in shape.

Alternatively or additionally, the surface attachment plate and/or the device attachment plate mechanically adhere to the surface and electronic device, respectively.

Alternatively or additionally, the surface attachment plate and/or the device attachment plate include an adhesive, suction cups, or nano-suction technology for mechanically adhere to the surface and electronic device, respectively.

Alternatively or additionally, the collar includes a center plate and the first joint and the second joint extend from opposite faces of the center plate.

Alternatively or additionally, the first joint and the second joint are both ball joints.

Alternatively or additionally, each ball joint includes a housing, a bearing, and a sleeve. The sleeve maintains the position of the bearing within the housing.

Alternatively or additionally, the housing of the first joint includes a first end with an opening shaped to prevent the bearing from passing through the opening of the housing of the first joint and allow articulatable connection between the surface attachment plate and the bearing of the first joint located within the housing of the first joint. The housing of the second joint includes a first end with an opening shaped to prevent the bearing from passing through the opening of the housing of the second joint and allow articulatable connection between the device attachment plate and the bearing of the second joint located within the housing of the second joint.

Alternatively or additionally, the housing of the first joint is fixedly attached to the housing of the second joint.

Alternatively or additionally, a portion of the bearing of the first joint extends through the opening of the first end of the housing of the first joint. A portion of the bearing of the second joint extends through the opening of the first end of the housing of the second joint.

Alternatively or additionally, the surface attachment plate and/or the device attachment plate is magnetic. The mount additionally includes a mounting disc magnetically attracted to the surface attachment plate and/or the device attachment plate.

Alternatively or additionally, a face of the magnetic disk includes an adhesive.

According to another aspect, there is provided a system including an electronic device and the mount. The electronic device includes a device mounting disc attached to a rear surface of the electronic device. The system further includes a surface mounting disc attached to the surface. The device attachment plate is magnetically attracted to the device mounting disc. The surface attachment plate is magnetically attracted to the surface mounting disc.

Alternatively or additionally, the electronic device is a mobile phone or a tablet computer.

According to a further aspect, there is provided a mount for securing an electronic device to a surface. The mount includes a magnetic surface attachment plate configured to attach to the surface and a magnetic device attachment plate configured to attach to the electronic device. The magnetic surface attachment plate and the magnetic device attachment plate both comprise a non-magnetic structure and at least one magnet that is maintained in position by the non-magnetic structure. The mount also includes a mounting disc magnetically attracted to at least one of the magnetic surface attachment plate and the magnetic device attachment plate. The mount further includes a collar comprising: a center plate, a first ball joint extending from a first face of the center plate at a first end of the collar, and a second ball joint extending from a second face opposite the first face of the center plate at a second end of the collar. The surface attachment plate is articulatably connected to the first ball joint with a first post and the device attachment plate is articulatably connected to the second ball joint with a second post. The first ball joint and the second ball joint both include a housing, a bearing, and a sleeve, the sleeve maintaining a position of the bearing within the housing. The housing includes a first end with an opening shaped to: prevent the bearing from passing through the opening of the housing of the first ball joint and allow articulatable connection between the surface attachment plate and the bearing of the first ball joint located within the housing of the first ball joint. The housing of the second joint includes a first end with an opening shaped to: prevent the bearing from passing through the opening of the housing of the second joint and allow articulatable connection between the device attachment plate and the bearing of the second joint located within the housing of the second joint. The housing of the first ball joint is fixedly attached to the housing of the second ball joint.

A number of features are described herein with respect to embodiments of the invention; it will be appreciated that features described with respect to a given embodiment also may be employed in connection with other embodiments.

The following description and the annexed drawings set forth certain illustrative embodiments of the invention. These embodiments are indicative, however, of but a few of the various ways in which the principles of the invention may be employed. Other objects, advantages and novel features according to aspects of the invention will become apparent from the following detailed description when considered in conjunction with the drawings.

BRIEF DESCRIPTION OF THE DRAWINGS

The annexed drawings, which are not necessarily to scale, show various aspects of the invention in which similar reference numerals are used to indicate the same or similar parts in the various views.

FIG. 6 illustrates a blow up elevated side view of the mount.

FIG. 7 illustrates a blow up top angle view of the mount.

DETAILED DESCRIPTION

The following detailed description is merely exemplary in nature and is not intended to limit the described embodiments or the application and uses of the described embodiments.

As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper," "lower," "left," "rear," "right," "front," "vertical," "horizontal," and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Specific dimensions and other physical characteristics relating to the embodiments disclosed herein are therefore not to be considered as limiting, unless the claims expressly state otherwise.

Figure 1:
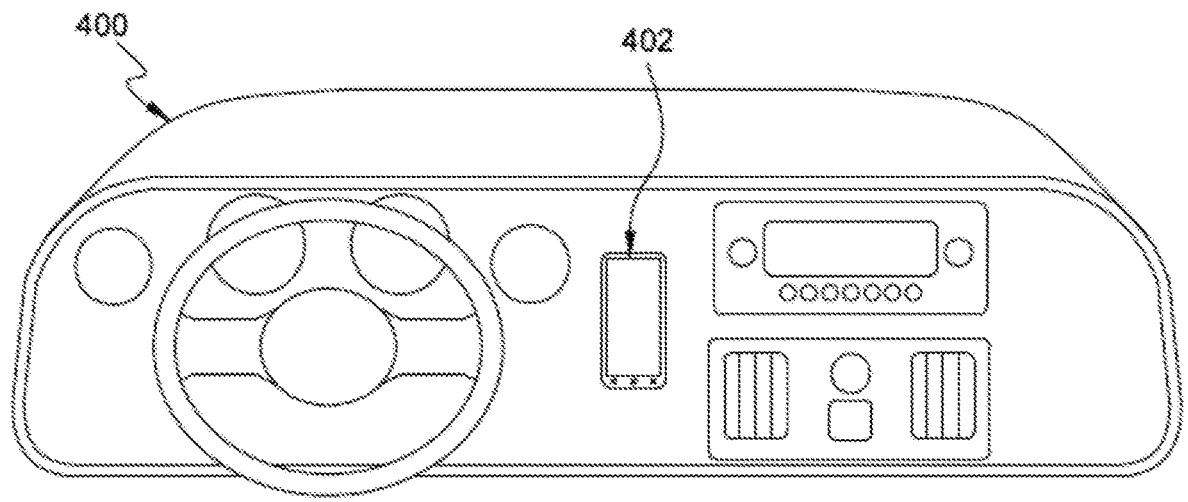
FIG. 1 illustrates a frontal view of an exemplary portable electronic device attached to a forward facing section of a dashboard through a mount.
Figure 2:
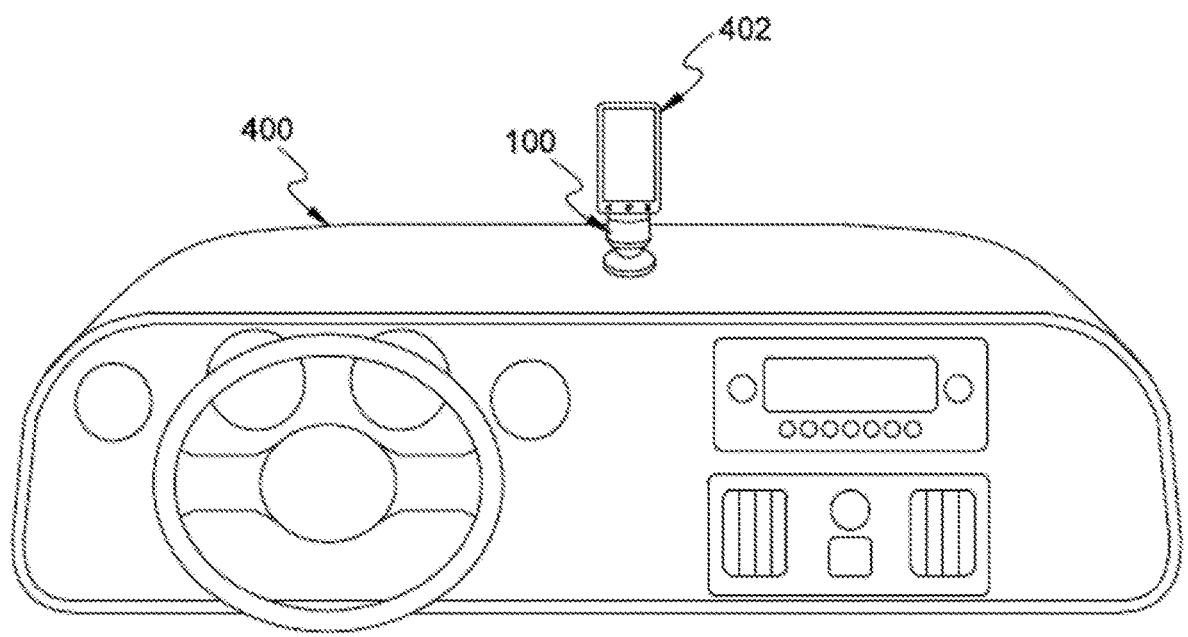
FIG. 2 illustrates a frontal view of the portable electronic device shown FIG. 1 attached to an upward facing section of a dashboard through the mount.

A multi-positional mount 100 is shown in FIGS. 1-6. The mount 100 is configured to mount a portable electronic device 402 to a surface (e.g., a dashboard of a vehicle) 400. As illustrated in FIGS. 1 and 2, mount 100 may be configured to hold a portable electronic device 402 in a multitude of positions or locations on a region of a dashboard 400. Mount 100 utilizes a surface attachment plate 218 and a device attachment plate 118, respectively, to enable detachable attachment to a region of dashboard 400 and a region of portable electronic device 402. That is, surface attachment plate 218 is configured to attach to the surface 400 and the device attachment plate 118 is configured to attach to the electronic device 402.

For example, FIG. 1 illustrates a frontal view of portable electronic device 402 attached to a forward facing section of a dashboard 400 through mount 100. In this arrangement, mount 100 can be adjusted laterally, coplanar with the forward facing section of the dashboard 400 to better operate and view portable electronic device 402. FIG. 2 illustrates a frontal view of the portable electronic device shown FIG. 1 attached to an upward facing section of dashboard 400 through mount 100. In this arrangement, the mount 100 can be adjusted in any direction and orientation to better operate and view portable electronic device 402.

Figure 3:
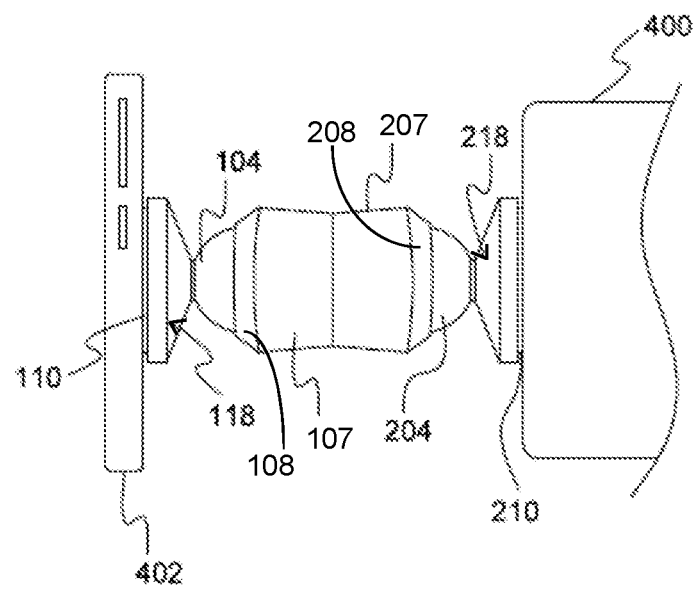
FIG. 3 illustrates a close up side view of the mount between a surface and the portable electronic device.
Figure 4:
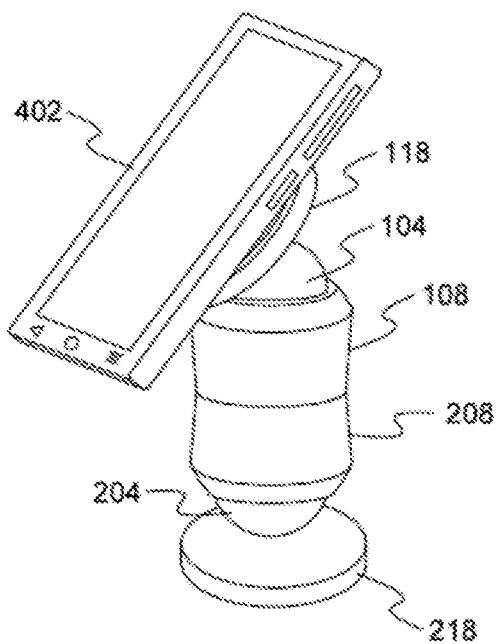
FIG. 4 illustrates a close up vertical view of the mount between the dashboard and the portable electronic device.

Thus, as FIG. 3 shows, mount 100 is sandwiched between dashboard 400 and portable electronic device 402 in a generally horizontal orientation, while enabling adjustable, multi-positional manipulation of the position of the portable electronic device 402. Similarly, FIG. 4 illustrates mount 100 serving as a bridge between dashboard 400 and portable electronic device 402, while disposed in a generally vertical orientation. This vertical orientation enables adjustable, multi-positional manipulation of the position of the portable electronic device 402 from an upright position on dashboard 400.

Portable electronic device 402 may include, without limitation, a smartphone, an MP3 player, a video player, a tablet, a PDA, a GPS unit, or any electronic device. The surface 400 may include a portion of an automobile, boat, motorcycle, airplane, or any suitable surface. For example, the mount 100 may attach to a table, counter, wall, window, etc.

The surface attachment plate 218 and/or device attachment plate 118 may attach to the surface 400 and device 402, respectively, by magnetism or other means (e.g., friction, adhesives, etc.). As an example, when using magnets to attach to the surface 400 and/or device 402, the apparatus 10 may also include a metal plate 310 that attaches to the portable electronic device 402 and/or the dashboard 400. For example, the metal plate(s) 310 may be attached with adhesives to the surface 400 and/or device 402.

Figure 5:
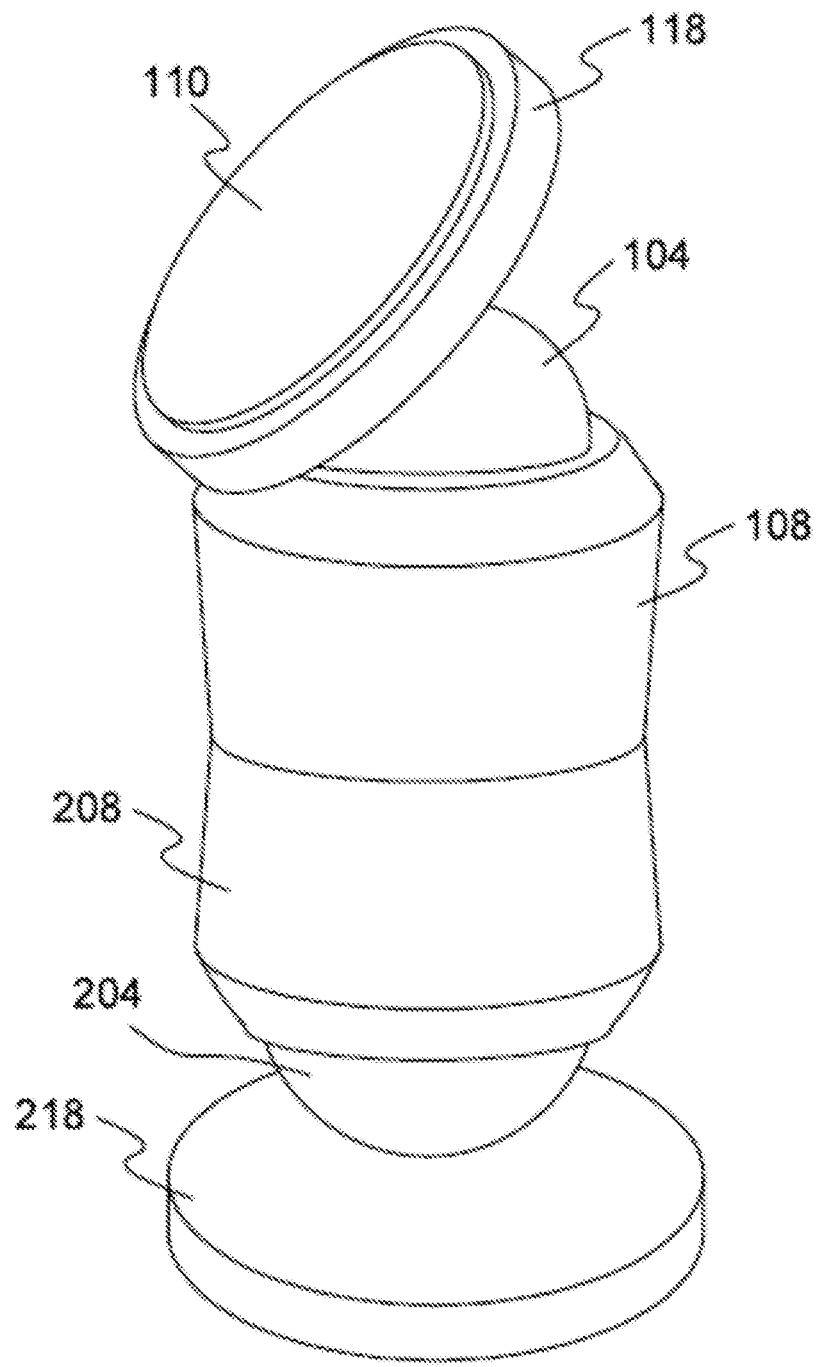
FIG. 5 illustrates a perspective view of the mount.

Turning now to FIG. 5, the mount 100 includes a collar 18 including a first joint 204 located at a first end of the collar 208 and a second joint 104 located at a second end 108 of the collar 18. The surface attachment plate 218 is articulatably connected to the first joint 204 and the device attachment plate 118 is articulatably connected to the second joint 104. The surface attachment plate 218 may be secured to the first joint 204 by a first post 212 and the device attachment plate 118 may be secured to the second joint 104 by a second post 112. At least one of the first post 212 or the second post 112 may be directly connected to the surface attachment plate 218 or the device attachment plate 118 and the first joint 204 or the second joint 104. For example, the surface attachment plate 218 may be directly attached to the first joint 204 by a first post 112 and/or the device attachment plate 118 may be directly attached to the second joint 104 by a second post 112.

As will be understood by one of ordinary skill in the art, the surface attachment plate 218 may be directly attached to the first joint 204 and/or the device attachment plate 118 may be directly attached to the second joint 104. As an example, the surface attachment plate 218 may be welded or glued to the first joint 204 and/or the device attachment plate 118 may be welded or glues to the second joint 104 by a second post 112.

Turning to FIGS. 6 and 7, the surface attachment plate 218 and/or the device attachment plate 118 may be magnetic. For example, the surface attachment plate 218 and/or the device attachment plate 118 may include a non-magnetic structure 110, 210 and at least one magnet 120, 220. The non-magnetic structure 110, 210 may maintain the position of the at least one magnet 120, 220. As shown in the figures, the non-magnetic structure 110, 210 may be conical in shape. For example, a majority of the visible portion of the non-magnetic structure 110, 210 may be conical in shape. The non-magnetic structure 110, 210 may also be formed of separate pieces 110*a*, 110*b*, 210*a*, 210*b* as shown in FIGS. 6 and 7.

Alternatively or additionally, the surface attachment plate 118 and/or the device attachment plate 118 may mechanically adhere to the surface 400 and electronic device 402, respectively. For example, the surface attachment plate 218 and/or the device attachment plate 118 may include an adhesive, suction cups, or nano-suction technology for mechanically adhering to the surface 400 and electronic device 402, respectively. As will be understood by one of ordinary skill in the art, any suitable technology or device may be used to adhere the surface attachment plate 218 and/or the device attachment plate 118 to the surface 400 and the electronic device 402, respectively With continued reference to FIGS. 6 and 7, the collar 18 may include a center plate 300 and the first joint 204 and the second joint 104 extend from opposite faces of the center plate 300. The first joint 204 and the second joint 104 may be both ball joints. Each ball joint 104, 204 may include a housing 107, 207, a bearing 103, 203, and a sleeve 106, 206. The sleeve 106, 206 may be configured to maintain the position of the bearing 103, 203 within the housing 107, 207. The ball joint may enable pivotal articulation of the electronic device 402 in multiple directions (e.g., up to 180°) and from both ends of mount 100.

As will be understood by one of ordinary skill in the art, the first joint 204 and the second joint 104 may comprise any suitable joint that allows rotation in at least two planes. For example, each of the joints 104, 204 may comprise a single joint (e.g., a ball joint or cardan joint) or a combination of two or more joints (e.g., two hinge joints) that enable each of the joints 104, 204 to rotate collectively in at least two planes.

The housing 207 of the first joint 204 includes a first end with an opening 209 shaped to prevent the bearing 203 from passing through the opening 209 of the housing 207 of the first joint 204. The opening 209 is also shaped to allow articulatable connection between the surface attachment plate 218 and the bearing 203 of the first joint 204 located within the housing 207 of the first joint 204. The housing 107 of the second joint 104 includes a first end with an opening 109 shaped to prevent the bearing 103 from passing through the opening 109 of the housing 107 of the second joint 104. The opening 109 is also shaped to allow articulatable connection between the device attachment plate 118 and the bearing 103 of the second joint 104 located within the housing 107 of the second joint 104. The housing 207 of the first joint 204 may be fixedly attached to the housing 107 of the second joint 104. For example, the housing 207 of the first joint 204 may include an inner thread portion 222 that mates with an outer thread portion 122 of the housing 107 of the second joint 104. A portion of the bearing 203 of the first joint 204 may extend through the opening 209 of the first end of the housing 207 of the first joint 204. A portion of the bearing 103 of the second joint 104 may extends through the opening 109 of the first end 104 of the housing 107 of the second joint 104.

The mount 100 may also include a mounting disk 310. When the surface attachment plate 218 and/or the device attachment plate 118 is magnetic, the mounting disk 310 may be magnetically attracted to the surface attachment plate 218 and/or the device attachment plate 118. A face of the magnetic disk 310 may include an adhesive. For example, the adhesive may be used to attach the magnetic disc 310 to the electronic device 402 or the surface 400.

The mount 100 may also include a second washer 114 defined by a second hole 116 configured to enable passage of second post 112. The second washer 114 may create spacing to enable enhanced articulation of the bearing 104 of the second joint in the first sleeve 106. The mount 100 may also include a first washer 214 defined by a first hole 216 configured to enable passage of the first post 212. The second washer 214 may create spacing to enable enhanced articulation of the bearing 204 in the second sleeve 206.

The mount 100 may be either an aftermarket accessory addition to the vehicle or an option available at the time of purchase to render easy and convenient mounting of portable electronic device 402 without loose wires and providing proper positioning of a video camera built into a smart phone, for example. In one embodiment, portable electronic device 402 is positioned for viewing either through the windshield or backward onto the occupants enabling monitoring accidents between vehicles, the result of an accident on the occupants of the vehicle or for security monitoring of the trespassers within the vehicle. This is accomplished by mounting the portable electronic device 402 at the dashboard 400. Another advantage is to improve the power output of portable electronic device 402 by positioning an antenna of portable electronic device 402 near the windshield.

All ranges and ratio limits disclosed in the specification and claims may be combined in any manner. Unless specifically stated otherwise, references to "a," "an," and/or "the" may include one or more than one, and that reference to an item in the singular may also include the item in the plural.

The phrase "and/or" means "either or both" of the elements so conjoined, i.e., elements that are conjunctively present in some cases and disjunctively present in other cases. Other elements may optionally be present other than the elements specifically identified by the "and/or" clause, whether related or unrelated to those elements specifically identified unless clearly indicated to the contrary. Thus, as a non-limiting example, a reference to "A and/or B," when used in conjunction with open-ended language such as "comprising" can refer, in one embodiment, to A without B (optionally including elements other than B); in another embodiment, to B without A (optionally including elements other than A); in yet another embodiment, to both A and B (optionally including other elements); etc.

The word "or" has the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," may refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of."

The phrase "at least one," in reference to a list of one or more elements, means at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

The transitional words or phrases, such as "comprising," "including," "carrying," "having," "containing," "involving," "holding," and the like, are open-ended, i.e., meaning including but not limited to.

Although the invention has been shown and described with respect to a certain embodiment or embodiments, equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application

The invention claimed is:

1. A mount for securing an electronic device to a surface, the mount comprising:
   a magnetic surface attachment plate configured to attach to the surface;
   a magnetic device attachment plate configured to attach to the electronic device;
   wherein the magnetic surface attachment plate and the magnetic device attachment plate both comprise a non-magnetic structure and at least one magnet that is maintained in position by the non-magnetic structure;
   a mounting disc magnetically attracted to at least one of the magnetic surface attachment plate and the magnetic device attachment plate; and
   a collar comprising:
      a center plate;
      a first ball joint extending from a first face of the center plate at a first end of the collar; and a second ball joint extending from a second face opposite the first face of the center plate at a second end of the collar;

wherein the surface attachment plate is articulatably connected to the first ball joint with a first post and the device attachment plate is articulatably connected to the second ball joint with a second post;

wherein the first ball joint and the second ball joint both include: a monolithic housing, a bearing, and a sleeve;

wherein the sleeve is positioned between the bearing and the center plate to maintain a position of the bearing within the housing;

wherein the housing includes a first end with an opening shaped to:
  prevent the bearing from passing through the opening of the housing of the first ball joint; and
  allow articulatable connection between the surface attachment plate and the bearing of the first ball joint located within the housing of the first ball joint; and the housing of the second joint includes a first end with an opening shaped to:
  prevent the bearing from passing through the opening of the housing of the second joint; and
  allow articulatable connection between the device attachment plate and the bearing of the second joint located within the housing of the second joint; and wherein the housing of the first ball joint is fixedly attached to the housing of the second ball joint to form an enclosed internal volume, such that the internal volume is bounded by the housing of the first ball joint, the housing of the second ball joint, the bearing of the first ball joint, and the bearing of the second ball joint.

2. A system including an electronic device and the mount of claim 1, wherein:
  the electronic device includes a device mounting disc attached to a rear surface of the electronic device;
  the system further comprises a surface mounting disc attached to the surface;
  the device attachment plate is magnetically attracted to the device mounting disc; and
  the surface attachment plate is magnetically attracted to the surface mounting disc.

3. The system of claim 2, wherein the electronic device is a mobile phone or a tablet computer.

4. The mount of claim 1, wherein at least one of the first post or the second post are directly connected to the surface attachment plate or the device attachment plate and the first joint or the second joint.

5. The mount of claim 1, wherein the surface attachment plate is directly attached to the first joint by a first post and/or the device attachment plate is directly attached to the second joint by a second post.

6. The mount of claim 1, wherein the surface attachment plate is directly attached to the first joint or the device attachment plate is directly attached to the second joint.

7. The mount of claim 1, wherein the non-magnetic structure is frustoconical in shape.

8. The mount of claim 1, wherein:
  a portion of the bearing of the first joint extends through the opening of the first end of the housing of the first joint; and
  a portion of the bearing of the second joint extends through the opening of the first end of the housing of the second joint.

9. The mount of claim 1, wherein a face of the magnetic disk includes an adhesive.

10. The mount of claim 1, wherein the collar, the sleeve of the first ball joint, and the sleeve of the second ball joint are each separate discrete pieces from one another.

11. The mount of claim 1, wherein the center plate does not include spring washers.

12. The mount of claim 1, wherein:
  the center plate includes spokes radiating inwardly towards a center of the center plate; and
  the spokes meet at a center of the center plate.

* * * * *